US009842509B2

(12) United States Patent
Van Lookeren Campagne et al.

(10) Patent No.: US 9,842,509 B2
(45) Date of Patent: Dec. 12, 2017

(54) SIX-DEGREE-OF-FREEDOM MOTION SIMULATOR ASSEMBLY

(71) Applicant: E2M TECHNOLOGIES BV, Amsterdam (NL)

(72) Inventors: Pieter Van Lookeren Campagne, Amsterdam (NL); Rabin El Zaher, Amsterdam (NL)

(73) Assignee: E2M TECHNOLOGIES B.V., Amsterdam (NL)

( * ) Notice: Subject to any disclaimer, the term of this patent is extended or adjusted under 35 U.S.C. 154(b) by 246 days.

(21) Appl. No.: 14/442,173

(22) PCT Filed: Nov. 13, 2013

(86) PCT No.: PCT/NL2013/050818
§ 371 (c)(1),
(2) Date: May 12, 2015

(87) PCT Pub. No.: WO2014/077685
PCT Pub. Date: May 22, 2014

(65) Prior Publication Data
US 2016/0140862 A1   May 19, 2016

(30) Foreign Application Priority Data

Nov. 14, 2012   (NL) ..................... 2009805

(51) Int. Cl.
*G08B 9/08* (2006.01)
*G09B 9/12* (2006.01)
*G09B 9/14* (2006.01)

(52) U.S. Cl.
CPC   *G09B 9/12* (2013.01); *G09B 9/14* (2013.01)

(58) Field of Classification Search
USPC ............... 434/29, 30, 33, 34, 55, 58, 61, 62
See application file for complete search history.

(56) References Cited

U.S. PATENT DOCUMENTS 3,577,659 A * 5/1971 Kail ..................... B25J 17/0216
248/163.1
4,207,687 A * 6/1980 Haas ................... G06F 17/5009
434/49

(Continued)

FOREIGN PATENT DOCUMENTS

WO   9604636 A1   2/1996

OTHER PUBLICATIONS

International Search Report & Written Opinion for PCT/NL2013/050818; Feb. 7, 2014; 9 pgs.

*Primary Examiner* — Kurt Fernstrom
(74) *Attorney, Agent, or Firm* — Gardner Groff Greenwald & Villanueva, PC

(57) ABSTRACT

The invention is directed to a 6 degree-of-freedom motion hexapod simulator assembly comprising of a fixed base, a displaceable simulator platform comprising of a load bearing structure, and 6 linear actuators having upper ends thereof interconnected with the load bearing structure by three pairs of two-degree of freedom joints and lower ends thereof interconnected with the fixed base by means of three pairs of two-degree of freedom joints. The two degree of freedom joint comprises of two rotatable pivot means which are oriented 90° with respect to each other. One pivot means runs through the other pivot means. At the connection with the load bearing structure the center of one joint of a pair of joints is separated by part of the load bearing structure from the center of the other joint of the pair of joints.

28 Claims, 11 Drawing Sheets

(56) References Cited

U.S. PATENT DOCUMENTS

| | | | | |
|---|---|---|---|---|
| 4,280,285 A * | 7/1981 | Haas | G06F 11/277 | 434/30 |
| 4,753,596 A * | 6/1988 | Hart | G09B 9/14 | 434/29 |
| 5,451,134 A * | 9/1995 | Bryfogle | B23Q 1/5462 | 248/163.1 |
| 5,538,373 A * | 7/1996 | Kirkham | B23Q 1/5462 | 248/562 |
| 5,545,040 A * | 8/1996 | Lu | G09B 9/14 | 434/29 |
| 5,564,985 A * | 10/1996 | Engstrand | A63J 5/00 | 434/55 |
| 5,568,993 A * | 10/1996 | Potzick | B23Q 1/5462 | 403/128 |
| 5,829,982 A * | 11/1998 | Advani | G09B 9/14 | 434/38 |
| 5,857,917 A * | 1/1999 | Francis | A63G 31/16 | 434/55 |
| 5,975,907 A * | 11/1999 | Advani | A63G 31/16 | 434/29 |
| 6,113,500 A * | 9/2000 | Francis | A63G 31/16 | 472/130 |
| 6,592,374 B1 * | 7/2003 | Kim | G09B 9/04 | 434/29 |
| 6,790,041 B2 * | 9/2004 | Fountain | G09B 9/16 | 434/30 |
| 7,124,660 B2 * | 10/2006 | Chiang | A47B 91/16 | 74/490.05 |
| 7,806,697 B2 * | 10/2010 | Mallaci | G09B 9/00 | 434/29 |
| 8,403,673 B2 * | 3/2013 | Atluri | G09B 9/14 | 434/55 |
| 9,068,622 B2 * | 6/2015 | Malchev | F16F 9/53 | |
| 2003/0180693 A1 * | 9/2003 | Mulder | G09B 9/04 | 434/58 |
| 2005/0042578 A1 * | 2/2005 | Ammon | G09B 9/04 | 434/62 |
| 2007/0111170 A1 * | 5/2007 | Lefton | A63G 31/16 | 434/29 |
| 2008/0268404 A1 * | 10/2008 | Burt | G09B 19/12 | 434/55 |
| 2009/0035739 A1 * | 2/2009 | Alemzadeh | A61C 11/00 | 434/264 |
| 2009/0246741 A1 * | 10/2009 | Soodeen | G09B 9/12 | 434/55 |

* cited by examiner

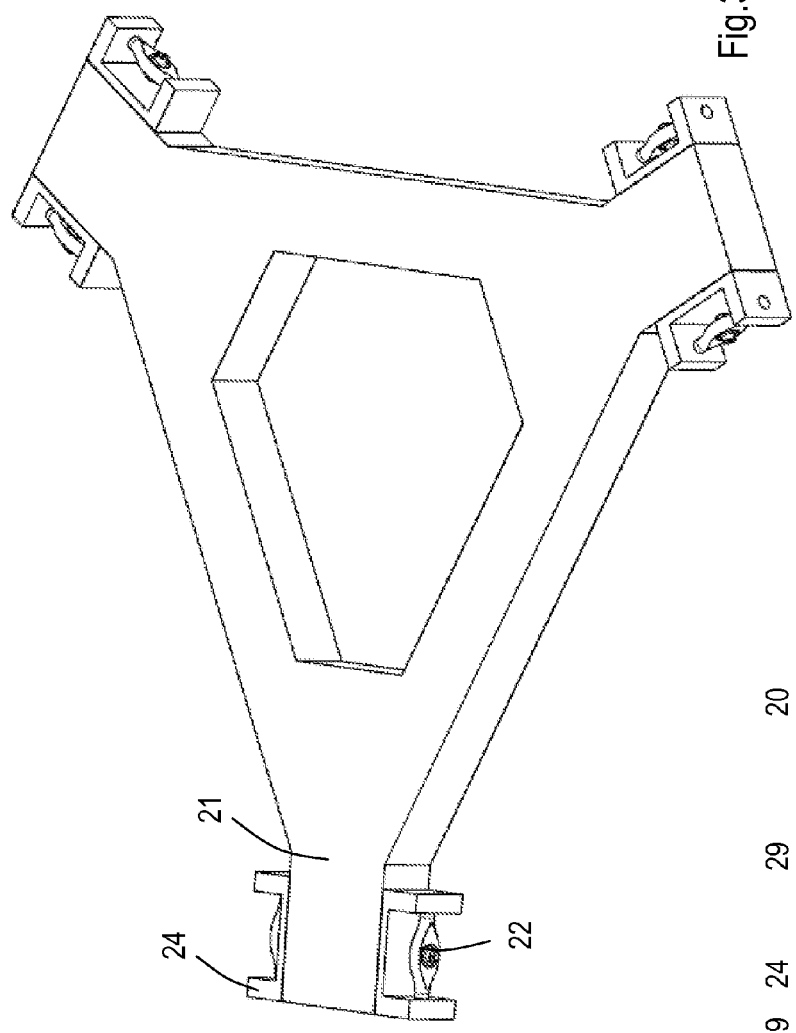
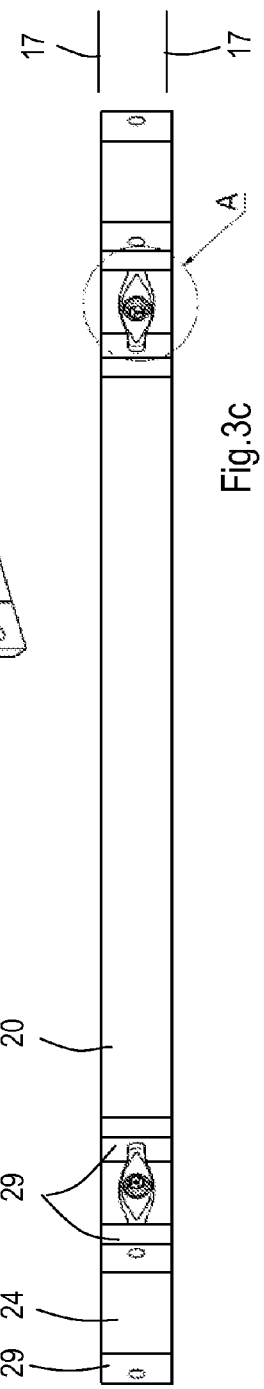

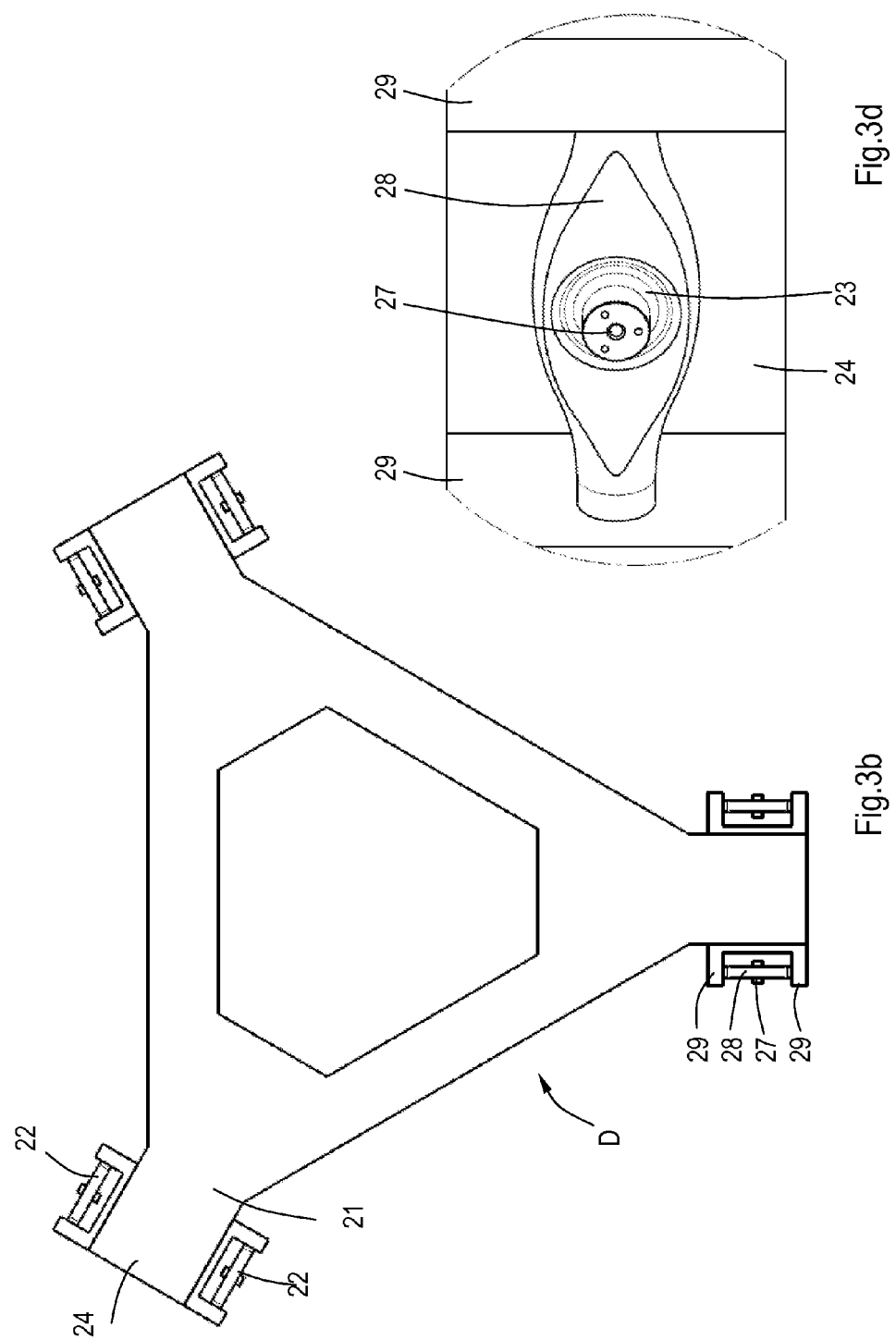

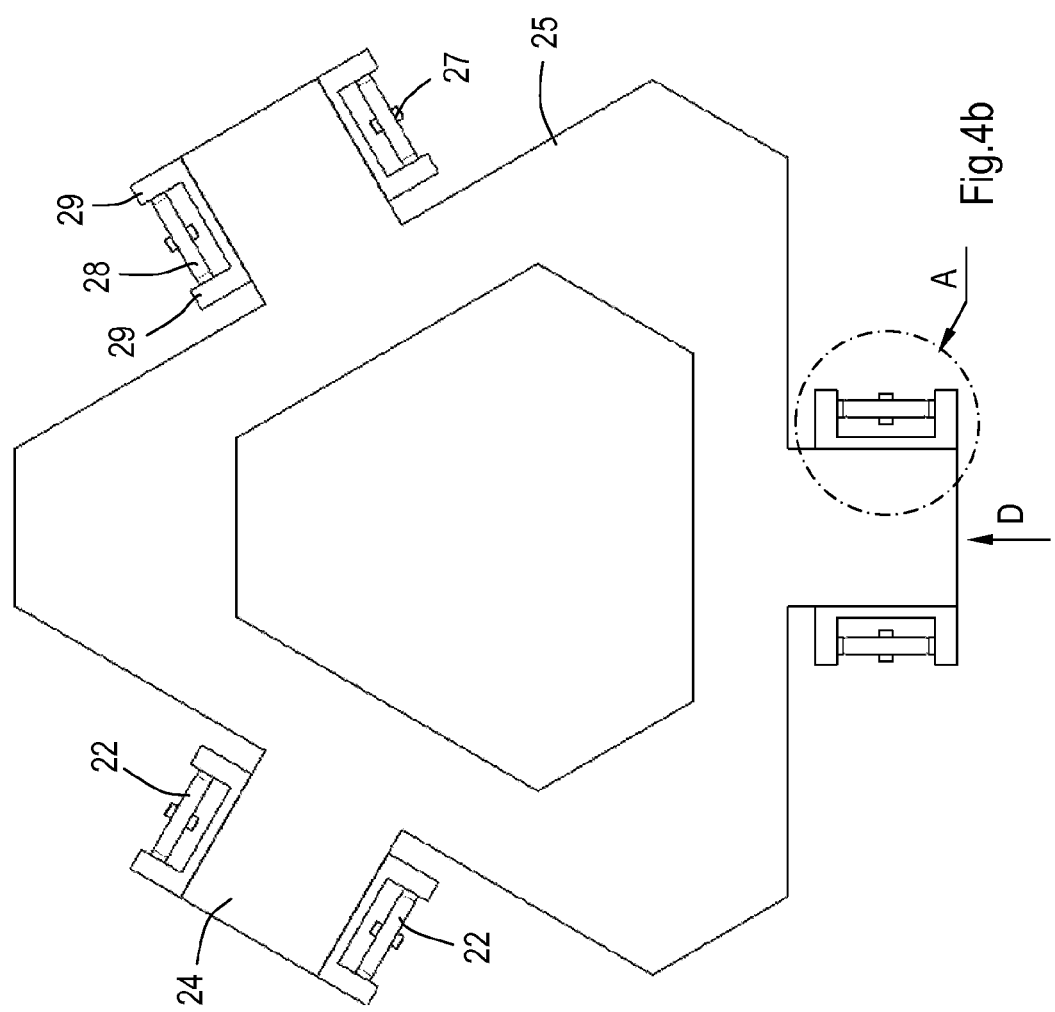

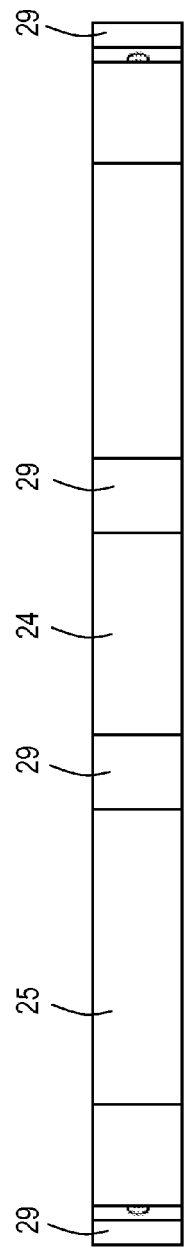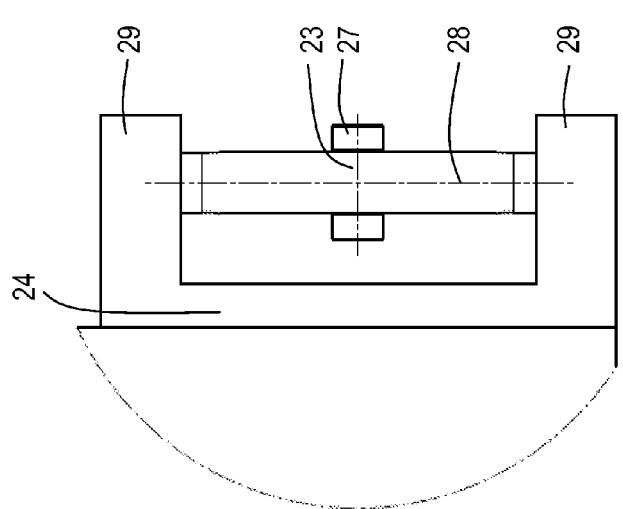

SIX-DEGREE-OF-FREEDOM MOTION SIMULATOR ASSEMBLY

FIELD OF INVENTION

The invention is directed to a six degree-of-freedom motion hexapod simulator assembly comprising a base, a load bearing structure, and six linear actuators having upper ends thereof connected to the load bearing structure by three pairs of two-degree-of-freedom joints and lower ends thereof connected to the base by means of two-degree-of movement joints.

BACKGROUND OF THE ART

Hexapod type simulator assemblies are known and for example described in U.S. Pat. No. 3,577,659 and US2007/0059668. Such assemblies, which are capable of moving within six degrees of freedom, are also referred to as Stewart platform. These platforms are typically used for flight simulation to train pilots. US2007/0059668 describes a displaceable motion platform supported by six linear actuators. The six actuators are fixed at their upper end to a bearing block. The bearing block comprises resilient material to avoid vibrations. The bearing blocks themselves are bolted to the lower side of the motion platform itself.

U.S. Pat. No. 3,577,659 also illustrates an assembly wherein six actuators are coupled to the lower side of a load bearing structure by means of six three-degree-of-freedom movement joint.

Commercially available Stewart platforms, like for example the platforms obtainable from Moog (see http://www.moog.com/products/motion-systems/motion-bases/) all have a mount for receiving a joint, wherein the mount is fixed to the lower side of a load bearing structure.

A disadvantage of the known six-degree-of-freedom motion simulator assembly is that the centre of gravity of the total assembly is relatively high. Especially when large cabins such as shown in FIG. 5 of US2007/0059668 are placed on top of the load bearing structure the centre of gravity will be at a relatively high elevation relative to the base. The higher the elevation of the centre of gravity the higher the forces exercised on the actuators will be. There is a continuous desire to limit the elevation of the centre of gravity since these types of platform were first developed in the 1970's.

SUMMARY OF THE INVENTION

The object of the present invention is to provide a six-degree-of-freedom motion hexapod simulator assembly wherein the elevation of the centre of gravity is limited. This object is achieved by a six degree-of-freedom motion hexapod simulator assembly comprising a base, a load bearing structure, and six linear actuators having upper ends connected to the load bearing structure by two-degree-of-freedom joints and lower ends thereof connected to the fixed base by means of two-degree-of-freedom joints. Each two-degree-of-freedom joint comprises two pivot means with orthogonally crossing pivot axes, with one pivot means running through the other pivot means. The two-degree-of-freedom joints are connected in pairs to the load bearing structure. One joint of a pair of joints is separated by a part of the load bearing structure from the other joint of the pair of joints, in particular a part contributing to the transfer of gravity and movement loads from the load bearing structure to the linear actuators.

These measures make it possible to suspend the load bearing structure, typically a platform, between the pivoting joints of the actuators instead of positioning the structure on top of these joints. This way, the load bearing structure can be positioned at or below the level of the joints enabling an improved distribution of forces during use.

Applicants found that by mounting the joint relative to the load bearing structure according to the invention the elevation of the centre of gravity can be lowered as compared to the state of the art design. The reduction in elevation may even be 0.4 m or more. This lowering of the centre of gravity will reduce the forces exercised on the assembly, lower the power consumption and enables one to make use of less powerful actuators. In addition the eye point of the user as positioned, in use, on top of the load bearing structure, e.g. in a cabin or the like, will be lowered relative to the so-called motion platform centroid (MPC). This will result in an improved motion cuing, i.e. less parasitic acceleration, because the vertical distance between the MPC and the user eye point, for example a pilot eye point, is reduced. The MPC is the geometrical centre of the hexagon formed by the 6 joint centres. Finally because the height of the entire assembly and possible cabin or other structure placed on top of the load bearing structure can be lowered it is possible to place the assembly in a building with a lower ceiling.

BRIEF DESCRIPTION OF THE DRAWINGS

FIG. 2d: shows in detail; a two-degree-of-freedom joint of the platform of FIG. 2a;

FIG. 3a: shows schematically a motion platform of a simulator assembly according to the invention;

FIG. 3b: shows the motion platform of FIG. 2a in bottom view;

FIG. 3c: shows the motion platform of FIG. 2a in side view;

FIG. 3d: shows in detail; a two-degree-of-freedom joint of the platform of FIG. 2a;

FIG. 4b: shows the motion platform of FIG. 4a in bottom view;

FIG. 4c: shows the motion platform of FIG. 4a in side view;

FIG. 4d: shows in detail; a two-degree-of-freedom joint of the platform of FIG. 4a;

DETAILED DESCRIPTION OF THE INVENTION

Figure 1:
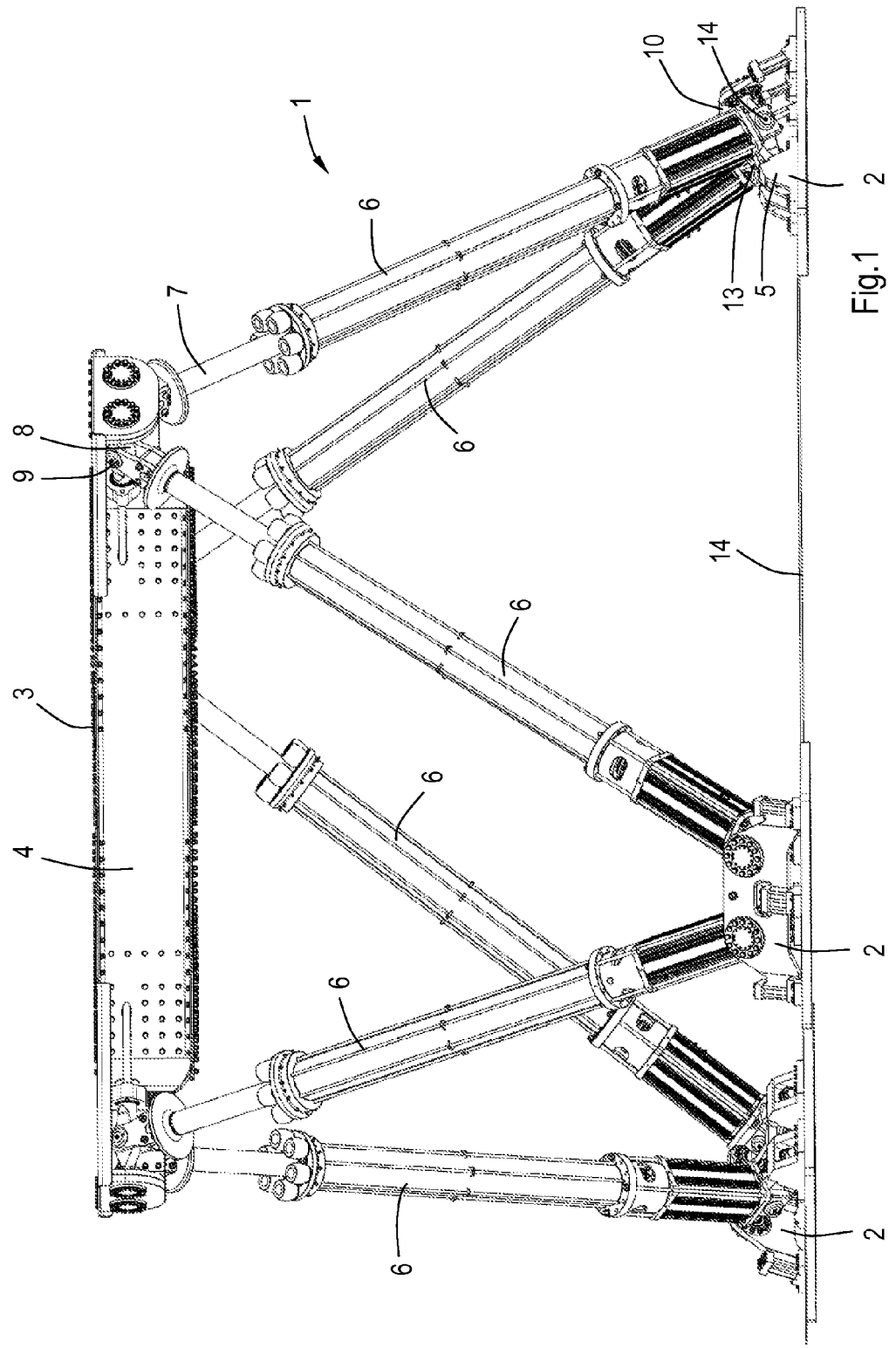
FIG. 1: shows an embodiment of a hexapod simulator assembly according to the invention.

A load bearing structure according to the present invention is any structure suitable for supporting the cabin or other functions placed on top of the structure to form a simulator. The structure may have or comprise any form, for example triangle or a star shape, for example have the shape of a star with at least three legs to which three pairs of joints are connected to. The part separating the two centers of the pair of joints is preferably present at the corners of a triangular load bearing structure or at three ends of a star shaped structure. The structure may be a solid structure, a solid structure composed of one or more openings, a welded construction or more preferably a structure comprising metal u-profiles and metal plates bolted together.

The structure may have structural elements present between two parallel planes. The structure may have a flat upper plane which faces a user structure and a structure extending away from said flat plane at its lower side, for example to provide additional strength and to comprise equipment of the simulator itself.

The part which separates the joint of a pair of joints from the other joint is part of this load bearing structure. One will immediately recognize that by positioning the joints at the level of the load bearing structure and not bolted to the lower side of said structure a reduction in elevation of the entire assembly is achieved. The terms upper and lower refer to the orientation of the simulator assembly in normal use. Optionally, the centers of the two paired joints are separated by the part of the load bearing structure, the centers being the crossing of the two orthogonal pivot axes. The separating part of the load bearing structure can for example comprise a web or flange of the load bearing structure contributing to the transfer of forces exerted by gravity or movement of the structure directly or indirectly to the linear actuators.

The load bearing structure is suitably present between two parallel oriented planes having a distance between the planes defined by the structural elements making up the load bearing structure. The MPC will then be positioned at a position between these two planes. The part separating the two joint centers will then be positioned between these two planes.

By separating one centre of a joint from the other centre of a joint by a part of the load bearing structure is meant that when a line is drawn from one centre of a joint to the other centre of a joint the line will run through the part of the load bearing structure.

The two-degree-of-freedom joint according to the present invention is also known as a universal joint. The two-degree-of-movement joint comprises two rotatable pivot means. The axis of one pivot means is oriented 90° with respect to the axis of the other pivot means. One pivot means runs through the other pivot means. The axis of the two pivot means may intersect or cross. If they intersect the centre of the joint is the point where the two axes intersect. If they do not intersect the centre of the joint is defined by the centre of the pivot means which is directly coupled to the load bearing structure and closest to the axis of the other pivot means. Pivot means are for example shafts, for example made of metal, which shafts are rotatable around their axis.

One pivot means will be supported by bearings at either end of the pivot means and fixed to the load carrying structure. This pivot means is also referred to in this field as the fixed axis. The other pivot means may be rotationally positioned between two ends extending from the actuator, also referred to in this field as the free axis. One of the pivot means runs rotationally through the other pivot means. Suitably the pivot means of the actuator, the free axis, runs rotationally through the pivot means fixed to the load bearing structure, i.e. the fixed axis. Other constructions for the two-degree-of-freedom joint known to the skilled person may also be used.

The two joints of a pair may for example have substantially coplanar fixed axes, e.g. in a parallel arrangement. The two free axes may also be coplanar, defining a plane substantially orthogonal to the plane defined by the fixed axes. The plane of the two fixed axes of a pair of joints may for example make an angle of 0-20 degrees or be substantially parallel to an upper surface of a platform formed by the load bearing structure, the plane of the free axes being orthogonal to the plane of the fixed axes.

The bearings fixed to the load carrying structure are suitably part of a block comprising the bearings, the bearing blocks, and fixed to the part of the load bearing structure separating the two centers of the joints according to the invention. Preferably the two bearing blocks belonging to one joint of a pair of joints are bolted on one side of the part of the load bearing structure and the two bearing blocks belonging to the other joint of the pair of joints are bolted on the opposite side of the part of the load bearing structure. Preferably two bearing blocks as present on either side of the structure part are fixed to the structure part by one or more bolts running from one bearing block through the structure part to the opposite bearing block. The two-degree-of-freedom joints can for example be connected pairwise to respective peripheral sections of the load bearing structure. More particularly, the joints can be pairwise connected to respective corner sections of the load bearing structure, each corner section comprising an extension of the load bearing structure protruding in a direction in a plane defined by the corners sections, said extension forming the part separating the joints of a pair of joints.

In a specific embodiment, the extension of at least one of the corners sections can be formed by a strip or girder extending between the joining ends of the two structural beams. The strip or girder may for example have an inwardly extending end joint to a cross-beam extending between the two structural beams.

In a first embodiment of the invention the load bearing structure has the form of a star having at least three legs. The part of the load bearing structure separating the joint centers is present at three ends of the star shaped structure.

In a second embodiment of the invention the load bearing structure comprises a triangle structure. The part of the load bearing structure separating the joint centers is present at the three corners of the triangle structure.

Suitably each of the three corners of the triangle structure comprise of a corner structure comprising two elongated structural parts, wherein the two structural parts are aligned with the two sides of the triangle defining the corner and which two elongated structural parts meet at the corner to further extend in a parallel fashion for some distance outwardly in the plane of the triangle structure, as a parallel part, wherein the parallel part is the part of the load bearing structure separating the centre of one joint of a pair of joints and the centre of the other joint of the pair of joints.

The parallel part may terminate at an end part extending outwardly at both sides of the parallel part and wherein the fixed axis of the joint is supported at one end by a bearing present in the part extending outwardly and at its other end by a bearing present in a bearing block fixed to the parallel part or to elongated structural part. The bearing block may be supported by an axis support beam extending from the side of the triangular structure closest to said bearing block and in the same direction as the direction of the fixed axis supported by the bearing block.

The elongated structural part, the parallel part and the part which extends outwardly are made from one plate, referred to as the combined part. The bends may be made by forging and the like. This avoids welding and bolting at the highly stressed areas of the load bearing structure. The elongated structural parts will not be present along the entire length of the side of the triangle but instead only run parallel for some distance with the side of the triangle. The parts may be bolted at that location to the side of the triangle. In this manner the combined part will not become too large which simplifies its manufacture.

A single fixing plate may be fixed to the outward looking surfaces of the two parts extending outwardly. The fixing plate may have a surface facing the structure to be supported. The corner structure or parts thereof may be covered at its upper side with a cover plate. This cover plate is fixed, for example by bolting, to the corner structure to enhance the strength of the structure. Fixing this cover plate may be to the afore mentioned surface facing the structure and to the structure forming the corner.

A user structure will typically be positioned on top of the load bearing structure. Such user structure will comprise means to position a user, for example a pilot seat and the like, instruments, for example joysticks, steering means, visual displays, computers and an instructor station. At the interface of the load bearing structure and the user structure damping means may suitably be present. Positioning damping means at this position is preferred over the position described in the aforementioned US2007/0059668. In the prior art the damping means are present in a bearing block bolted to the lower side of the load bearing structure. In use the resilient material will endure excessive moment loads around a reference point in the resilient material which may result in premature failure. By positioning the resilient material of which the damping means are composed of at the interface of the load bearing structure and the user structure no such disadvantageous moment loads are exercised upon the resilient material while at the same time vibrations are more effectively minimized.

In their mid- or settled position the actuators are preferably of equal length, e.g., with an upwardly extending piston or shaft. The lower ends can be arranged pairwise at three different positions on the base of the assembly. Typically, the lower end of each actuator is paired with a different actuator than its upper end, so the six actuators essentially define an octahedron configuration.

DETAILED DESCRIPTION OF THE FIGURES

FIG. 1 shows a six-degree-of-freedom motion hexapod simulator assembly 1 comprising of a fixed base 2, a displaceable simulator platform 3 comprising of a load bearing structure 4. In use fixed base 2 will be mounted to a floor or another supporting structure, for example a rail. Also shown are six linear actuators 6 having upper ends 7 thereof interconnected with the load bearing structure 4 by three pairs 8 of two-degree-of-freedom joints 9. The lower end 10 of the actuators 6 are interconnected with the fixed base 2 by means of three pairs 13 of two-degree-of-freedom joints 14. In use the fixed base will be firmly anchored on a floor. The fixed base may comprise of bearing blocks 5 for the pair of two-degree-of-freedom joints 13 which are interconnected by base beams 14 thus forming a triangle.

The actuators 6 are linear actuators. The linear actuator may be a hydraulic and more preferably an electromechanical actuator. The preferred electromechanical linear actuator may be of a known type and as such includes a drive mechanism, which may include an electric motor having a rotatable output shaft, an outer tube or cylindrical member surrounding a lead screw connected to the output shaft, an extensible inner tube or cylindrical member containing an internal nut engaged with the lead screw such that turning of the screw by the motor extends or retracts the inner tube which acts as the outer extensible end of the actuator, and a position feedback transducer to determine the position of the inner cylindrical member with respect to the outer cylindrical member. Such an actuator configuration is well known in the art and as such will not be described further herein. The electromechanical linear actuators depicted and described herein are but one type of such electrically-powered linear actuators which can be employed in combination with the assembly according to the present invention.

For example, such alternate electrically-powered linear actuators could have side mounted motors, rather than the inline type depicted herein, or other drive mechanisms such as those which are belt and/or gear driven.

Figure 2A:
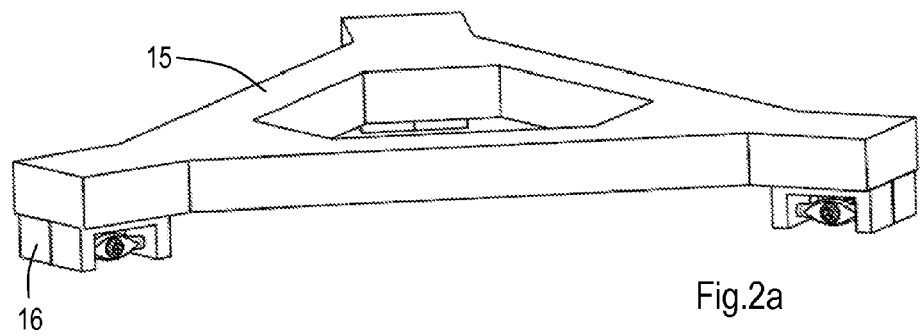
FIG. 2a: shows schematically a motion platform of a simulator assembly according to the prior art.
Figure 2B:
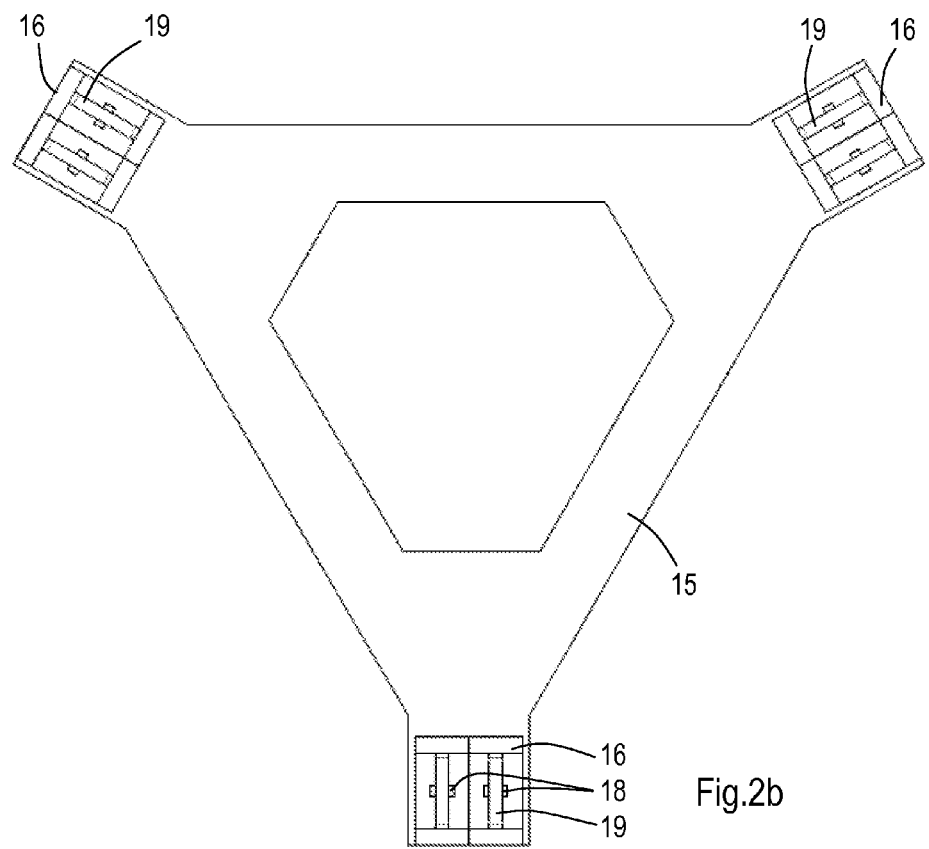
FIG. 2b: shows the motion platform of FIG. 2a in bottom view.
Figure 2C:
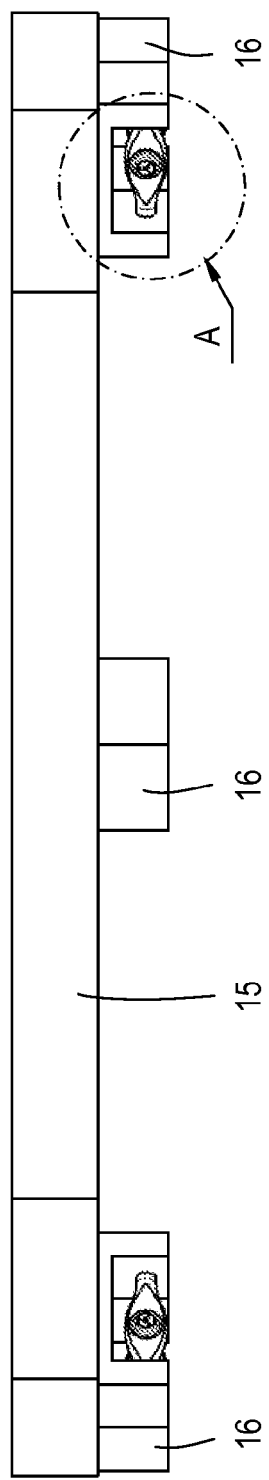
FIG. 2c: shows the motion platform of FIG. 2a in side view.
Figure 2D:
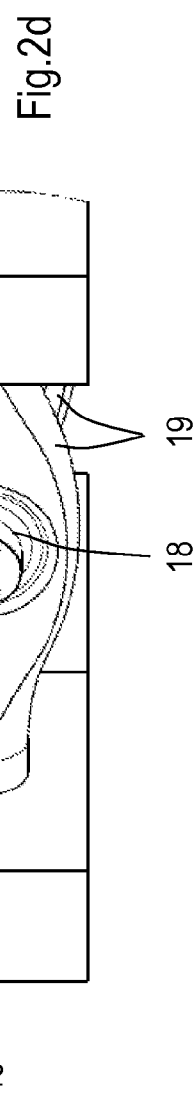

FIG. 2a shows a load bearing structure 15 of a six-degree-of-freedom motion hexapod simulator assembly according to the prior art. A load bearing structure 15 is shown having the form of a triangle. At a corner of the triangle a bearing block 16 is fixed to the lower side of the load bearing structure 15. One bearing block 16 will accommodate a pair 19 of two-degree-of-movement joints connecting two actuators (not shown) to each corner. Between the centre 18 of one joint and the centre of the other joint of the same pair 19 no part of the load bearing structure is present. FIG. 2b shows the load bearing structure 15 of FIG. 2a from the lower side. FIG. 2c shows the load bearing structure of FIG. 2a from aside. FIG. 2d shows the detail A of FIG. 2c. Detail A is the bearing block 16.

FIG. 3a shows a load bearing structure 20 of a six degree-of-freedom motion hexapod simulator assembly according to the invention. At each corner 21 an identical pair of two-degree-of-freedom joints 22 is shown. Each joint 22 connects the upper end of an actuator (not shown) with the load bearing structure 20. The two-degree-of-freedom joint 22 has a pivot means 28 supported by two bearing blocks 29 at either end. Two bearing blocks 29 are shown. The pivot means 28 is supported by these bearings blocks 29. Bearing blocks 29 comprise bearings such that pivot means 28 can freely rotate. A second pivot means 27 runs through pivot means 28.

FIG. 3b shows the load bearing structure 20 of FIG. 3a from the lower side. FIG. 3c shows the load bearing structure of FIG. 3a from view point D. FIG. 3d shows the detail A of FIG. 3c. FIG. 3c shows the load bearing structure of FIG. 3a from aside. In this figure it can be seen that load bearing structure 20 is positioned between two parallel planes 17 positioned at a distance corresponding to the dimensions of the structural elements of which the load bearing structure is composed of. The MPC and the joint centers 23 are all positioned between said two planes.

Figure 5:
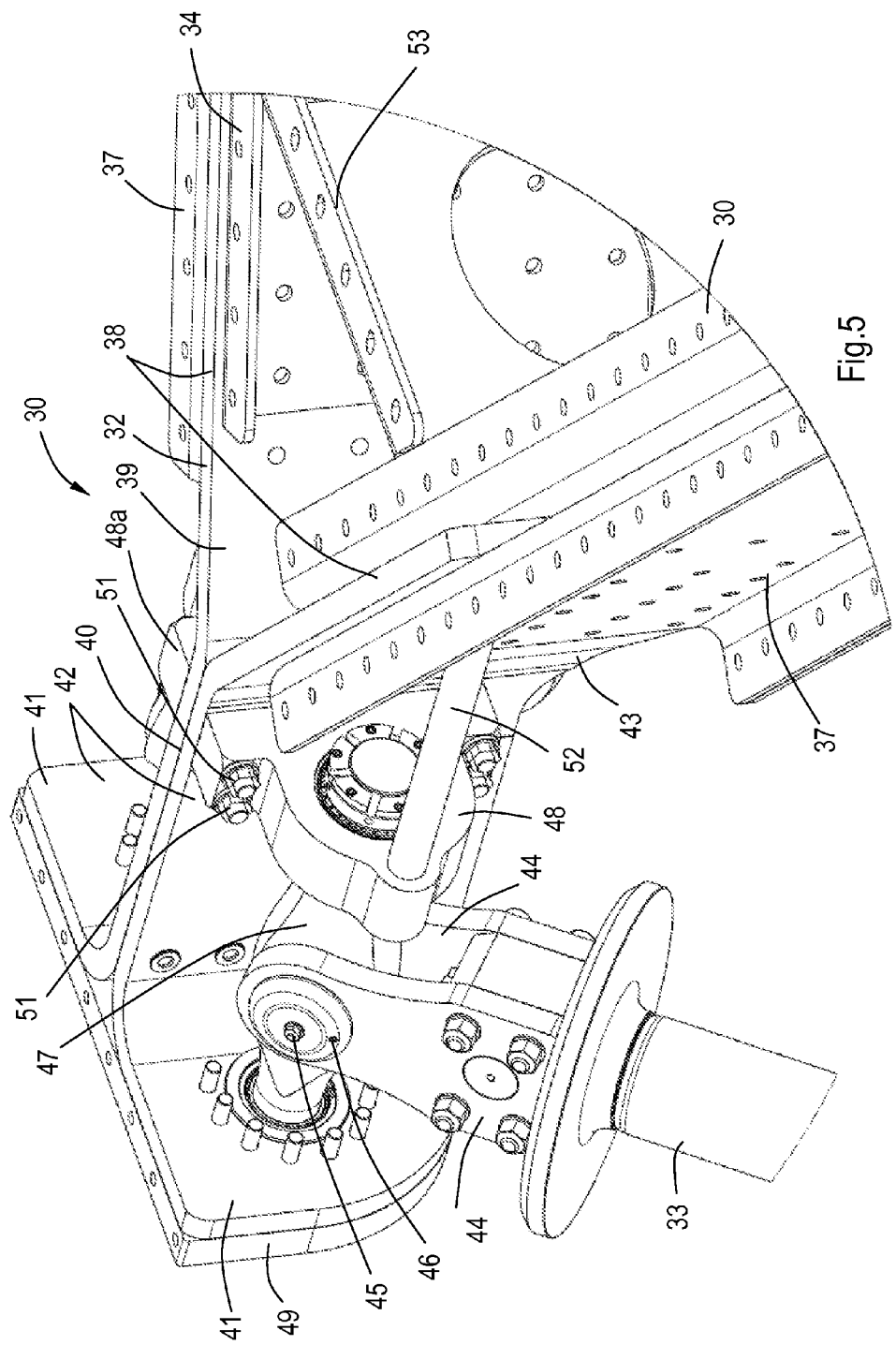
FIG. 5: shows a corner section of a further embodiment of a simulator assembly according to the invention.

FIG. 3 shows a pivot means 27 which is provided between two extending parts of the actuator (not shown in FIG. 3; see FIG. 5). In between said parts a pivot means 27 is rotatable. The pivot means 27 runs through a pivot means 28. FIG. 3d shows that the intersection of pivot means 27 and pivot means 28 is the joint centre 23. Part 24 of the load bearing structure 20 separates centre 23 of one joint from the corresponding centre of the second joint of the pair of joints. Comparing the elevation of the joint 22 in FIG. 3 with the elevation of bearing block 16 in FIG. 2 one easily recognizes that the structure in FIG. 3 can be lower than the structure of FIG. 2.

Figure 4A:
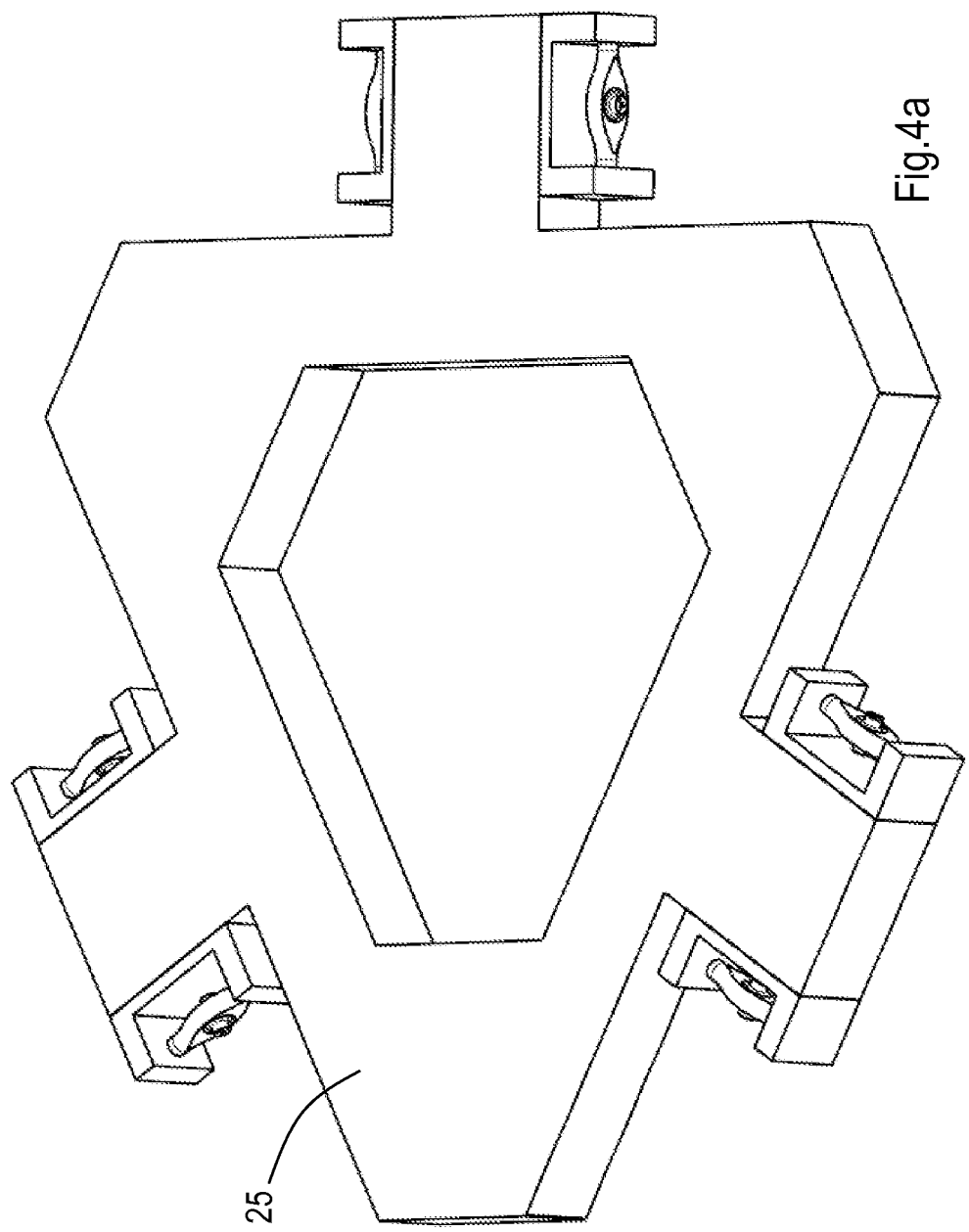
FIG. 4a: shows schematically a further exemplary embodiment of a motion platform according to the invention.

FIG. 4 shows a load bearing structure 25 of a six degree-of-freedom motion hexapod simulator assembly as in FIG. 3, except that the load bearing structure has the design of a star. The reference numbers used in FIG. 4a-d have the same meaning as in FIG. 3a-d.

FIG. 5 shows a corner of a motion hexapod simulator assembly according to the invention wherein the load bearing structure 30 has the form of a triangle. The structure is composed of flat metal plates and profiles, for example elongated U-profiles or L-profiles or H-profiles bolted together. FIG. 5 shows two elongated structural parts 38. Parts 38 are aligned with and fixed to the elongated structural elements 37 of the triangle structure 30. The two structural elements 38 meet and define a corner 39 of the triangle structure 30 and extend parallel for some distance outwardly in the plane of the triangle formed load bearing structure 30, as a parallel part 40. Parallel part 40 terminates at an end part 41 extending outwardly at both sides of the parallel part 40 to form two semi-enclosed spaces 42 at either side of the parallel part 40. In FIG. 5 end part 41 extends perpendicularly with respect to the parallel part 40. A single fixing plate 49 is fixed to the outward surfaces of the two end parts 11 extending outwardly. The semi-enclosed space 42 is defined by end plate 41, parallel part 40 and part 43 of the side of the triangle structure extending from corner 39.

The actuator 33, of which the upper part is shown in FIG. 5, has two ends 44 extending axially from the actuator 33. Between ends 44 a first pivot means 46 of universal joint 45 is present. A second pivot means 47 of universal joint 45 is present between the end plate 41 and a holder part 48 extending from the parallel part 40. The first pivot means 46 runs rotationally through the second pivot means 47. First and second pivot means are oriented 90° with respect to each other. Holder part 48 at one side of the parallel part 40 is fixed to holder part 48a as present at the other side of parallel part 40 by means of bolts 51.

The holder part 48 is supported by an axis support beam 52 extending from the side of the triangular structure 30 closest to said holder part 48 and in the same direction as the axial direction of the second pivot means 47.

FIG. 5 also shows a corner support beam 53 connecting two sides of the triangular structure 30 at corner 39 and spaced away from where the two sides of the triangle meet.

Figure 6:
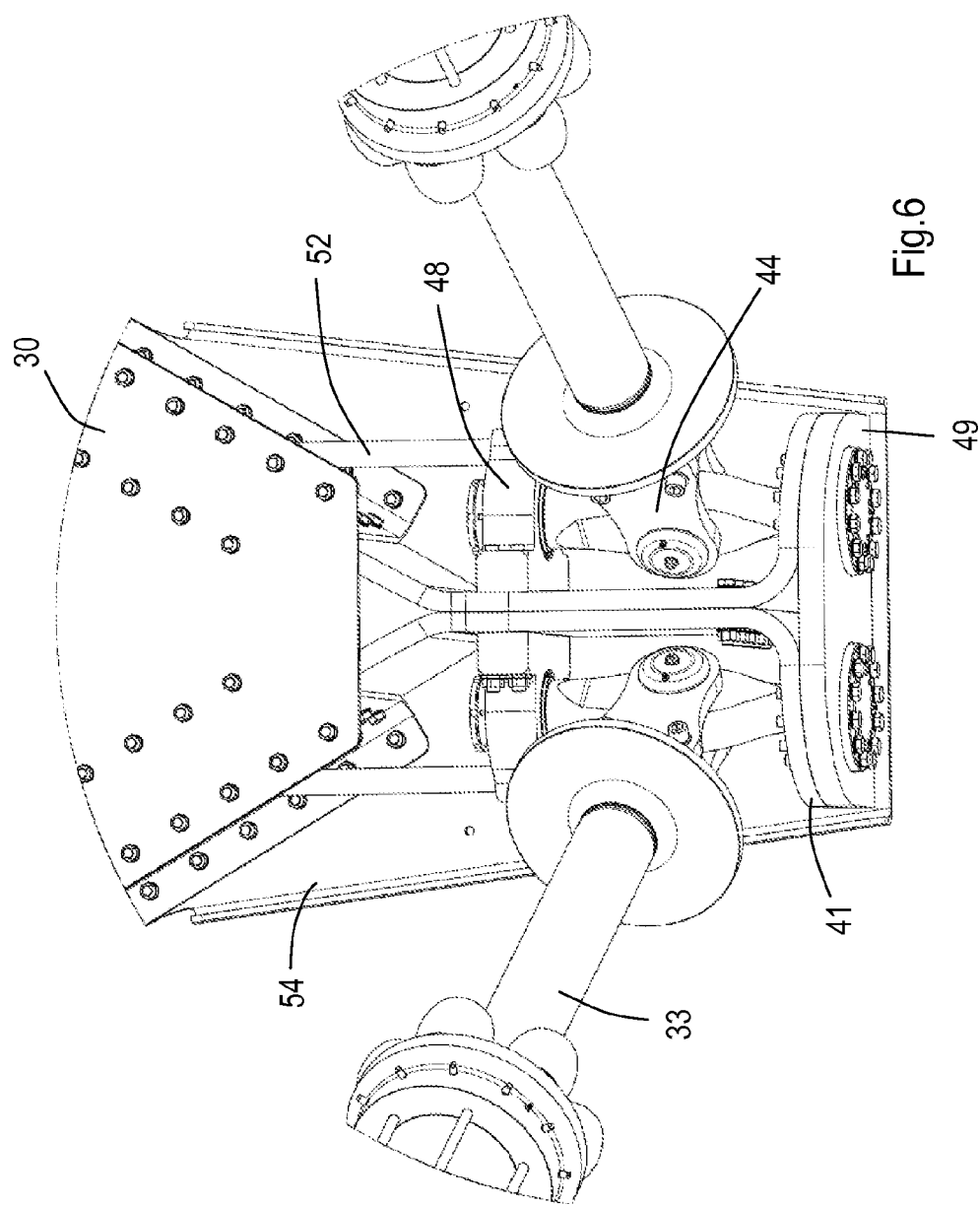
FIG. 6: shows the corner section of FIG. 5 in bottom view, wherein in addition a cover plate is fixed to the upper side of the corner structure.

FIG. 6 shows the corner of a motion hexapod simulator assembly as in FIG. 5 as seen from below wherein a cover plate 54 is added. The reference numbers in FIG. 6 have the same meaning as in FIG. 5.

Figure 7:
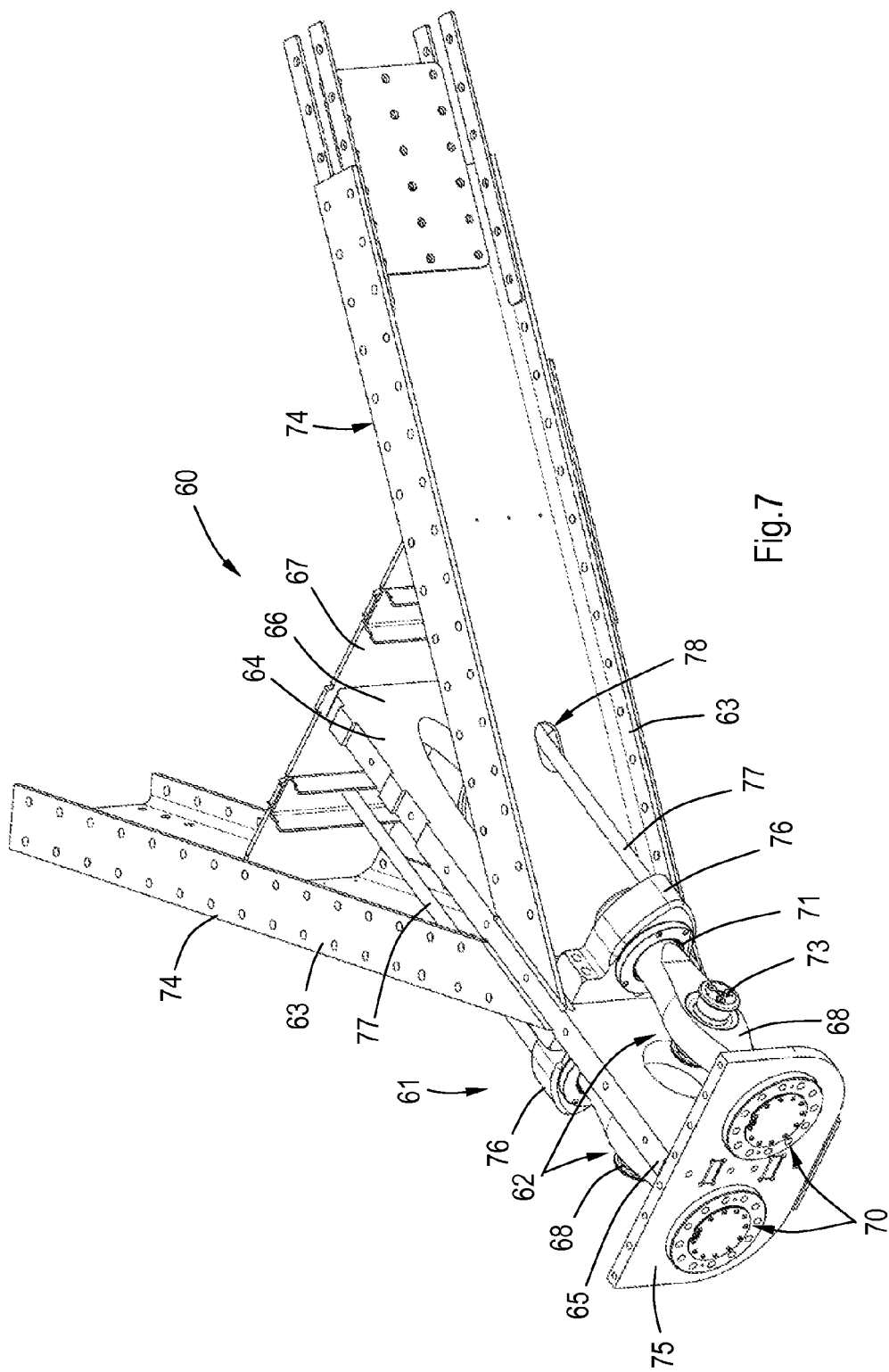
FIG. 7: shows a corner section of again a further embodiment of a simulator assembly according to the invention.

FIG. 7 shows a corner section 60 of a further possible embodiment of a hexapod simulator assembly. The corner section 60 comprises a pair 61 two-degree-of-freedom joints 62 to be connected to respective linear actuators (not shown). The two joints 62 are pairwise connected to the peripheral corner section 60 of the load bearing structure. The corner section 60 is formed by two converging ends 63 of peripheral structural beams of the load bearing structure. An extension of the load bearing structure is formed by a girder 64 symmetrically fixed between the joining ends 63 of the structural beams. The girder 64 has a first part 65 protruding outwardly in a direction in a plane defined by the corners sections 60, and an opposite second end 66 protruding in an opposite direction. The outwardly protruding end 65 of the girder 64 separates the paired two-degree-of-freedom joints 62. The inwardly extending end 66 of the girder 64 is joined, e.g., welded, to a cross-beam 67 bridging the two structural beams 63. The outer ends of the cross beam 67 are welded to the structural beams 63.

Both two-degree-of-freedom joints 62 have a fixed axis 68 extending between two bearings 70, 71 and a free axis 72 crossing the fixed axis. The fixed axis 68 and the free axis 72 are orthogonal. The two free axes 72 of the paired two-degree-of-freedom joints 62 extend within the same plane. Also the two fixed axes 68 of the paired two-degree-of-freedom joints 62 extend within the same plane, which is orthogonal to the plane of the free axes 72. The plane of the fixed axes 68 is parallel to the plane defined by the top faces 74 of the structural beams 63.

An end plate 75 caps the girder's outwardly protruding end 65. The end plate 75 extends symmetrically at both sides of the girder 64. The end plate 75 comprises a bearing 70 at both sides of the girder 64 for bearing one end of a fixed axis 68 of one of the paired two-degree-of-freedom joints 62. The opposite ends of the two fixed axes 68 are supported by respective bearing blocks 76 with the bearings 71 at either side of the girder 64 at the position of the joining beam ends 63. Rods 77 between the bearing blocks 76 and the cross beam 67 provide additional support for the bearing blocks 76. The rods 77 run though openings 78 in the structural beams 63. To save weight the girder 64 is provided with openings 79. One of the openings 79 is between the free axes 73 of the two paired joints 62. Notwithstanding this opening the girder 64 extends between the joints 62 and separates the two centers of the joints 62.

The invention claimed is:

1. A six-degree-of-freedom motion hexapod simulator assembly comprising a base, a load bearing structure, and six linear actuators having upper ends connected to the load bearing structure by two-degree-of-freedom joints and lower ends thereof connected to the fixed base by means of two-degree-of-freedom joints,
   wherein each two-degree-of-freedom joint comprises two pivot means with orthogonally crossing pivot axes, wherein one pivot means runs through the other pivot means,
   wherein the two-degree-of-freedom joints are connected in pairs to respective corner sections of the load bearing structure;
   wherein each corner section comprises an extension of the load bearing structure protruding in a direction in a plane defined by the corner sections, and
   wherein one joint of a pair of joints is separated by the extension of the load bearing structure from the other joint of the pair of joints.

2. Hexapod simulator assembly according to claim 1, wherein the load bearing structure is positioned between two parallel planes having a distance between the planes defined by the structural elements making up the load bearing structure and wherein the motion platform centroid is positioned between the two planes.

3. Hexapod simulator assembly according to claim 1, wherein the linear actuator is a hydraulic or an electromechanical actuator.

4. Hexapod simulator assembly according to claim 1, wherein at least one of the corner sections is formed by the joining ends of two structural beams extending in the plane of the corner sections, wherein the joining ends of the beams are bent to extend in a parallel fashion outwardly jointly forming the part of the load bearing structure separating a pair of joints from each other.

5. Hexapod simulator assembly according to claim 1, wherein the extension of at least one of the corners sections is formed by a strip or girder extending between the joining ends of the two structural beams.

6. Hexapod simulator assembly according to claim 5, the strip or girder having an inwardly extending end joint to a cross-beam extending between the two structural beams.

7. Hexapod simulator assembly according to claim 1, wherein one of the pivot means of at least one of the joints is supported at both ends by a bearing block and wherein the two bearing blocks belonging to one joint of a pair of joints are connected to one side of the part of the load bearing structure and wherein the two bearing blocks belonging to the other joint of the pair of joints are connected to the opposite side of the part of the load bearing structure.

8. Hexapod simulator assembly according to claim 1, wherein the extension supports a cross plate or an end plate extending outwardly at both sides of the extension and wherein both joints have an axis supported at one end by a bearing present in the cross plate or end plate and at its other end by a bearing present in a bearing block fixed to the extension or to an adjacent structural part.

9. Hexapod simulator assembly according to claim 8, wherein the bearing block is supported by an axis support beam extending from the side of the triangular structure closest to said bearing block and in the same direction as the direction of the axis supported by the bearing block.

10. Hexapod simulator assembly according to claim 8, wherein the extension and the cross plate or end plate are made from two symmetrically arranged and bent plates.

11. Hexapod simulator assembly according to claim 8, wherein a single fixing plate is fixed to the outward looking surfaces of the two plates extending outwardly and comprising a bearing.

12. Hexapod simulator assembly according to claim 1, wherein a user structure is positioned on top of the load bearing structure, wherein the user structure comprises means to position a user, instruments and visual displays, computers and an instructor station.

13. Hexapod simulator assembly according to claim 12, wherein at the interface of the load bearing structure and the user structure damping means are present.

14. Hexapod simulator assembly according to claim 1 wherein the two two-degree-of-freedom joints of a pair have coplanar fixed axes defining a first plane and free axes defining a second plane substantially orthogonal to the first plane defined by the fixed axes, which first plane makes an angle of 0-20 degrees to an upper surface of a platform formed by the load bearing structure.

15. A six-degree-of-freedom motion hexapod simulator assembly comprising a base, a triangular load bearing structure, and six linear actuators having upper ends connected to the load bearing structure by two-degree-of-freedom joints and lower ends thereof connected to the fixed base by means of two-degree-of-freedom joints,
wherein each two-degree-of-freedom joint comprises two pivot means with orthogonally crossing pivot axes, wherein one pivot means runs through the other pivot means,
wherein the two-degree-of-freedom joints are connected in pairs to respective corner sections of the triangular load bearing structure;
wherein each corner section comprises an extension of the load bearing structure protruding in a direction in a plane defined by the corner sections, and
wherein one joint of a pair of joints is separated by the extension of the load bearing structure from the other joint of the pair of joints.

16. Hexapod simulator assembly according to claim 15, wherein the load bearing structure is positioned between two parallel planes having a distance between the planes defined by the structural elements making up the load bearing structure and wherein the motion platform centroid is positioned between the two planes.

17. Hexapod simulator assembly according to claim 15, wherein the linear actuator is a hydraulic or an electromechanical actuator.

18. Hexapod simulator assembly according to claim 15, wherein at least one of the corner sections is formed by the joining ends of two structural beams extending in the plane of the corner sections, wherein the joining ends of the beams are bent to extend in a parallel fashion outwardly jointly forming the part of the load bearing structure separating a pair of joints from each other.

19. Hexapod simulator assembly according to claim 15, wherein the extension of at least one of the corners sections is formed by a strip or girder extending between the joining ends of the two structural beams.

20. Hexapod simulator assembly according to claim 19, the strip or girder having an inwardly extending end joint to a cross-beam extending between the two structural beams.

21. Hexapod simulator assembly according to claim 15, wherein one of the pivot means of at least one of the joints is supported at both ends by a bearing block and wherein the two bearing blocks belonging to one joint of a pair of joints are connected to one side of the part of the load bearing structure and wherein the two bearing blocks belonging to the other joint of the pair of joints are connected to the opposite side of the part of the load bearing structure.

22. Hexapod simulator assembly according to claim 15, wherein the extension supports a cross plate or an end plate extending outwardly at both sides of the extension and wherein both joints have an axis supported at one end by a bearing present in the cross plate or end plate and at its other end by a bearing present in a bearing block fixed to the extension or to an adjacent structural part.

23. Hexapod simulator assembly according to claim 22, wherein the bearing block is supported by an axis support beam extending from the side of the triangular structure closest to said bearing block and in the same direction as the direction of the axis supported by the bearing block.

24. Hexapod simulator assembly according to claim 22, wherein the extension and the cross plate or end plate are made from two symmetrically arranged and bent plates.

25. Hexapod simulator assembly according to claim 22, wherein a single fixing plate is fixed to the outward looking surfaces of the two plates extending outwardly and comprising a bearing.

26. Hexapod simulator assembly according to claim 15, wherein a user structure is positioned on top of the load bearing structure, wherein the user structure comprises means to position a user, instruments and visual displays, computers and an instructor station.

27. Hexapod simulator assembly according to claim 26, wherein at the interface of the load bearing structure and the user structure damping means are present.

28. Hexapod simulator assembly according to claim 15 wherein the two two-degree-of-freedom joints of a pair have coplanar fixed axes defining a first plane and free axes defining a second plane substantially orthogonal to the first plane defined by the fixed axes, which first plane makes an angle of 0-20 degrees to an upper surface of a platform formed by the load bearing structure.

* * * * *